(12) United States Patent
Bissantz

(10) Patent No.: US 10,460,478 B2
(45) Date of Patent: *Oct. 29, 2019

(54) SYSTEM COMPRISING PROVIDING MEANS FOR PROVIDING DATA TO A USER

(71) Applicant: Nicolas Bissantz, Nürnberg (DE)

(72) Inventor: Nicolas Bissantz, Nürnberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,048

(22) Filed: Mar. 13, 2017

(65) Prior Publication Data

US 2017/0186190 A1 Jun. 29, 2017

Related U.S. Application Data

(63) Continuation of application No. 14/471,236, filed on Aug. 28, 2014, now Pat. No. 9,626,652.

(51) Int. Cl.

| | | |
|---|---|---|
| *H05B 37/02* | (2006.01) | |
| *G06T 11/00* | (2006.01) | |
| *G06Q 10/10* | (2012.01) | |
| *G06T 11/20* | (2006.01) | |
| *G09F 9/33* | (2006.01) | |
| *G08B 5/36* | (2006.01) | |
| *H05B 33/08* | (2006.01) | |
| *G09F 9/302* | (2006.01) | |

(52) U.S. Cl.
CPC ............ *G06T 11/001* (2013.01); *G06Q 10/10* (2013.01); *G06T 11/206* (2013.01); *G09F 9/33* (2013.01); *H05B 37/02* (2013.01); *H05B 37/0209* (2013.01); *G08B 5/36* (2013.01); *G09F 9/302* (2013.01); *H05B 33/08* (2013.01)

(58) Field of Classification Search
CPC ... G09F 9/33; G09F 9/30; G09F 9/302; G09F 9/3023; G09F 9/00; H05B 33/08; H05B 33/0842; B60Q 1/2696
See application file for complete search history.

(56) References Cited

U.S. PATENT DOCUMENTS

| | | | |
|---|---|---|---|
| 2005/0222898 A1* | 10/2005 | Kumazawa | G06Q 30/0283 703/2 |
| 2008/0204268 A1* | 8/2008 | Dowling | H05B 37/02 340/815.45 |
| 2011/0109228 A1* | 5/2011 | Shimomura | H05B 37/0245 315/113 |
| 2013/0134902 A1 | 5/2013 | Mahale et al. | |
| 2014/0096067 A1* | 4/2014 | Finke | G06F 3/0484 715/780 |

* cited by examiner

*Primary Examiner* — Hongmin Fan
(74) *Attorney, Agent, or Firm* — Dilworth & Barrese, LLP.; Michael J. Musella, Esq.

(57) ABSTRACT

The invention relates to a system comprising providing means for providing data, electing means for electing one or more parameters associated to said data, assessment means for assessing at least one characteristic of at least one of said elected parameter, and a lighting system for office rooms which comprises one or more light sources, the lighting system being capable of emitting light of different characteristic to the office room. The system is configured such that the characteristic of the light emitted to the office room is changed depending on the characteristic of the elected parameter.

12 Claims, 1 Drawing Sheet

SYSTEM COMPRISING PROVIDING MEANS FOR PROVIDING DATA TO A USER

BACKGROUND OF THE INVENTION

The present invention relates to a system comprising providing means for providing data to a user.

It is known from the prior art to present a large number of data on a display of a computer such as economical data, technical data etc. The data may be arranged in a table comprising a number of columns as well as a number of lines.

Frequently such tables or any other arrays of data contain data as well as a lot of information related to different aspects of the data so that it might be difficult to maintain an overview and to make a quick assessment of the data, especially in case of a high number of data. Co-pending U.S. patent application Ser. No. 14/202,882 named "system comprising providing means for providing data to a user" provides a solution to enable such quick assessment.

Even if a quick assessment of the data on the screen is possible, the information is only displayed on the screen and the impact of the quality of the data to the user may be limited. Against this background it would be desirable to provide a system allowing an operator to experience the quality of the data in a more intense and innovative way.

SUMMARY OF THE INVENTION

The system of the present invention comprises providing means for providing data. These providing means may be a server connected over the internet or intranet, a computer or any other source of data.

The system further comprises election means for electing a parameter associated with said one or more of said data (the parameter may be the magnitude of one of the data itself). Accordingly there may be exactly one or at least one most important characteristic, such as the development of the turnover value, the characteristics of which is assessed by the assessment means. This elected parameter may be fixed or may be electable by a user or the system. In the latter case the user can decide which parameter shall be assessed so as to experience the quality of the elected data.

The system further comprises assessment means for assessing at least one characteristic of elected parameter. This assessment may be made for example by a comparison between the elected parameter and a reference value, e.g., a previous year value, the absolute value or the relative value of said elected parameter.

The system further comprises a lighting system for office rooms which comprises one or more light sources, the lighting system being capable of emitting light of different characteristic, e.g. different color and/or brightness to the office room.

The lighting system is coupled to the assessment means. The system is configured such that the characteristic of the light emitted to the office room is changed depending on a characteristic of the elected parameter.

Accordingly, the present invention is based on the idea to experience the quality of the elected parameter in an intense way by adapting the color and brightness of the office room light. This is oriented on the concept of so-called mood lighting. The office room may be lighted by the lighting system only. The inventive system may effect that the office room is bathed in different colors or brightness depending on the characteristic of the elected parameter.

For example, the lighting system may be adapted so as to emit light of a certain color, such as red, if the elected parameter has a certain negative characteristic, such as a decrease of a turnover value, and to emit light of another color, such as blue, if the elected parameter has a certain positive characteristics, such as an increase of sales etc. The same may apply not only for the color of light, such as red or blue, but as well for any characteristic of the light, such as the brightness of the light. Accordingly, for example an increase in sales is always linked to blue light, however, the brightness and/or color intensity of the light may be dependent on the actual number of the sales. Similarly, for example losses are always linked to red light, however, the brightness and/or color intensity of the light may be dependent on the actual number of losses.

In any case, the lighting system allows a user which resides in the office room to immediately experience the quality of selected or particularly important information even if a large number of data is available.

Suitable parameters encompass turnover values, sales, profits or losses. It may also be stock prices or stock market developments such as the Dow Jones development.

The characteristic of said light may be the brightness of the color or light. Accordingly it is possible to characterize a very negative characteristic with a dark red color and dimmed light and a slightly negative characteristic with a bright red color and brighter light etc. Furthermore the characteristic of said light may be flashing light or light rapidly changing color or brightness.

The system may further comprise a display means to illustrate a plurality of data and/or parameters to a user. The display means may comprise any kind of display and components which are required to present the data visibly to the user. The display means may be analogous (e.g., a blackboard) or digital (e.g., a screen).

The characteristic of the elected parameter may be a deviation from a reference value, the position of said elected parameter in a range of parameters, the absolute value of said elected parameter, or a prognosis of said elected parameter.

Said range may be defined by a number of previous parameters which are obtained over a certain period of time. Accordingly, it is possible to define a certain period of time, such as 12 month and to identify the range of the elected parameter between the maximum and the minimum which have been obtained during this period of time. In a next step the actual, i.e. elected parameter may be assessed by identifying the position of the elected parameter within said range. Based on this position the characteristic of the light may be elected.

Said reference value or said range may be the value of the same parameter (such as turnover) which has been obtained at a previous point of time (such as 12 months ago) or in a previous time period (such as the last quarter of a year). Accordingly, the characteristic of the light may be dependent on the absolute value or may be dependent on another value which has been obtained in the past, such as in a reference time point or reference time interval. Alternatively, the characteristic of the light may be dependent on the location of the current parameter within a range of previous parameters.

For example a light blue light of high brightness indicates that the parameter is the best or one of the best which has been obtained in the last 12 months (for example the data is located in the best third). For example a dark red light of low brightness indicates that the parameter is one of the worst which has been obtained in the last 12 months (for example the data is located in the worst third).

In accordance with a further aspect of the invention the characteristic of at least one of said elected parameters is the kind of parameter. Accordingly, it is possible to always use the light of the same color for one specific elected parameter, e.g. blue light for profits and red light for costs, regardless of its absolute or relative value.

Furthermore, the elected parameter may be split into sub-parameters (such as parameter per employee, region or similar), and the characteristic of light is elected depending on the value of said sub-parameter. For example, if a turnover value is available for each of the regions north, east, south and west, the user may elect one of the regions, such as north, and the characteristic of the light is dependent on the value of the according sub-parameter (such as the turnover value for the region north). The mechanism of separating a parameter (such as "region") into a plurality of parameters (such as "north, east, south, west") should by independent on any other manipulation of the data made by a user, such as separating any other parameter into sub-parameters.

The election of a parameter (or sub-parameter) may be performed by a mouse click or by pressing a key of the keyboard or by moving the mouse cursor on a display screen to said parameter (without pressing any key). This allows a user to quickly assess the parameters by simply moving the mouse cursor over a screen.

Alternatively, a user may point to different items of a physical board or data illustration, such as a blackboard, a physical icon and the like.

The light system may comprise any light source available on the market. It is preferred that the individual light sources are capable of producing light of different characteristic, e.g., light of different color or brightness. This avoids having to use one light source for every light characteristic. However, some light systems may comprise a plurality of different colored LEDs, e.g., red and blue LEDs which are individually or collectively emit light.

The light system can be the only light source in the office room and can be switched between normal mode (constant light of neutral color) and mood lighting.

The lighting system may be adapted so as to provide only two colors and/or degrees of brightness of light, wherein, e.g., the two colors may be blue and red. Of course the use of a higher number of colors and/or degrees of brightness is conceivable and part of the invention as well.

Against the background rendered in the introductory portion, the invention further provides a method of illustrating the quality of business data to a user, the method comprising
(a) providing data;
(b) electing one or more parameters associated to said data;
(c) assessing at least one characteristic of at least one of said elected parameter; and
(d) emitting light of different characteristic to the office room depending on the characteristic of the elected parameter.

Further optional details to the method correspond to the optional details explained in connection with the system of the invention.

Still further, the invention relates to using the system of the invention to illustrate the quality of business data to a user.

BRIEF DESCRIPTION OF THE DRAWINGS

Further details and advantages of the invention will become apparent by way of the example and figures described in the following. The figures show.

DESCRIPTION OF THE PREFERRED EMBODIMENTS

Figure 1:
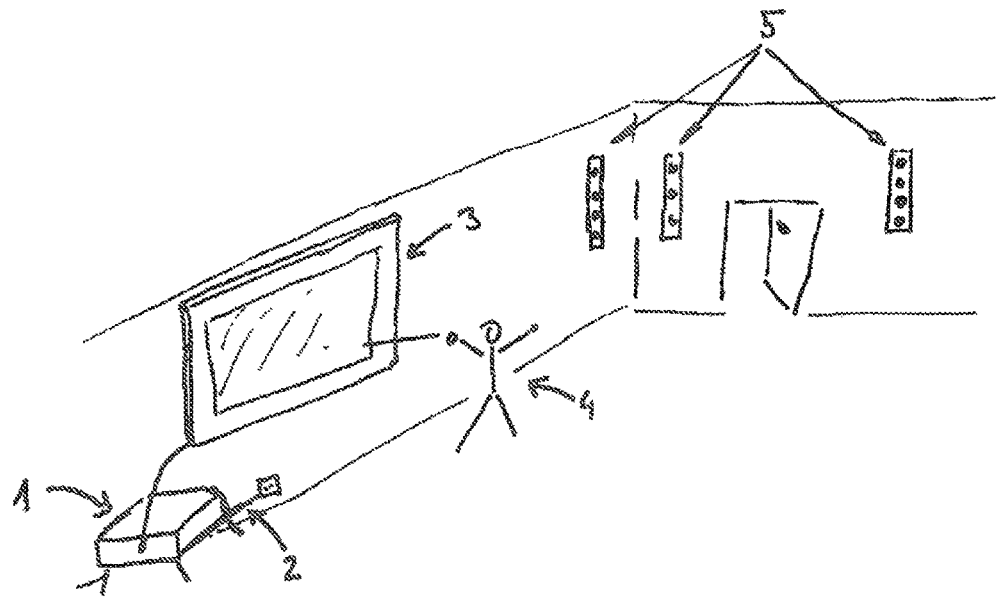
FIG. 1: schematic illustration of a system according to the invention.

The Figure illustrates a system according to the present invention which comprises a computer 1 connected to the intranet via connection 2. Business data are provided to the computer via the intranet. The computer comprises a touch-screen 3 on which the business data are illustrated.

A user 4 giving a presentation can elect a certain parameter (e.g., revenue) on the touchscreen such that the elected parameter is exposed on the screen 3 for review.

In addition to exposing the elected parameters, the computer 1 assesses at least one characteristic (e.g., development as compared to last year) of the elected parameter and based thereon evaluates whether the parameter is good or bad news.

The computer is connected to a lighting system 5 which acts as the only light source to the office room and provides bright colorless light in standard mode when mood lighting is deactivated. The system is also capable of providing light of alternative colors (e.g., blue and red) and higher or lower brightness to the office room. In case the option mood lighting is activated, the lighting of the office room will not be bright and colorless but will be chosen depending on whether the parameter is good or bad news based thereon. In case the revenue is worse than the year before, e.g., the color of light will be chosen red and the brightness will decrease.

Figure 2:
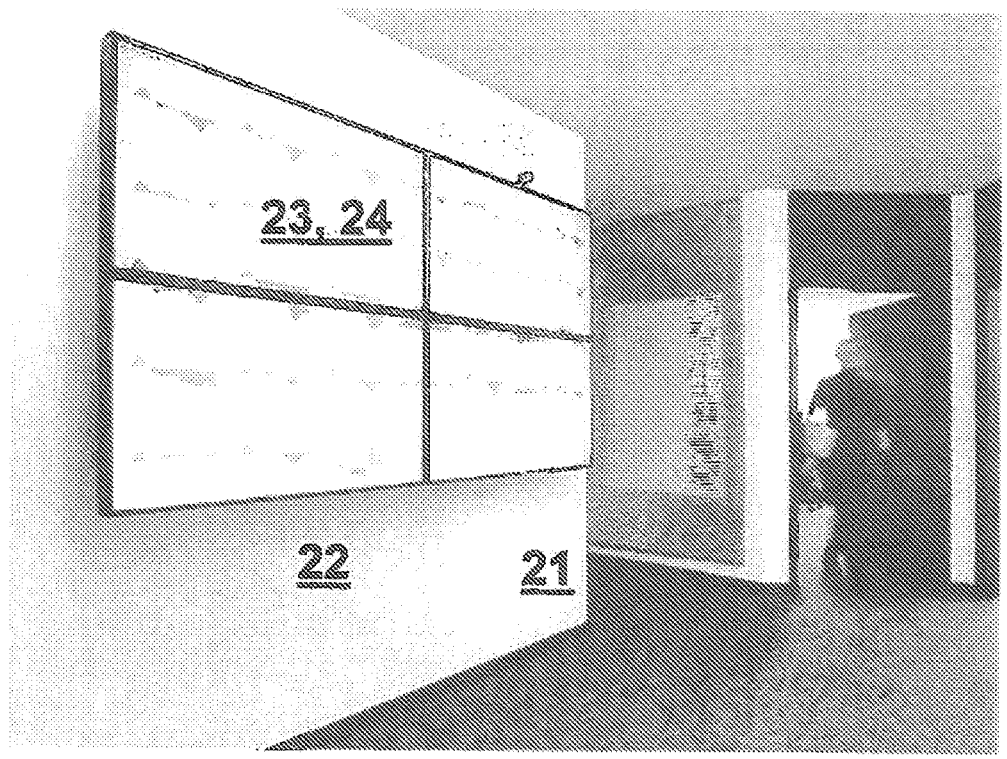
FIG. 2: picture of an office room equipped with a system according to the invention.

FIG. 2 illustrates an office room 21 within an office building. On a wall 22 of the room there are mounted a number of large displays 23 with touch screen function. The displays 23 illustrate certain data 24, e.g., revenue data for specific regions or fields of business. An employee or manager passing the screen or using the screen to demonstrate certain developments to co-workers may elect one set of data by touching the screen 24. An assessment means assesses the quality of the elected data and provides information to the lighting system of the room (not shown). According to the quality of the data, the ambient light of the room is changed.

One embodiment of the invention may be demonstrated by way of the following example.

Illustrated on a display means of a system according to the invention are a number of absolute and relative turnover values obtained between January and September of a year, e.g., for different products or areas of technology. The display means further illustrates a forecast for the turnover for the rest of the year, i.e. for the months October to December. On a certain location on the display means there is further illustrated a list of different conditions, such as, for example, region.

The user can elect one of the parameters (e.g., product or area of technology) and possibly also an additional condition (e.g., region).

The development and/or the forecast of the resulting sub-parameter are then displayed on the screen.

According to the invention, there is an assessment means which automatically determines whether the value of the elected sub-parameter is good or bad news, and how good or bad the news is. Assessment can be done, for example, by comparison of the sub-parameter with a threshold, by a comparison with the value of the same sub-parameter one year (or any other period of time) ago etc., by assessing the position of the value within a range of sub-parameters etc. The range of sub-parameters may be between the lowest and the highest parameter value in a reference time period, such as within the last year etc.

In addition to showing the data on the display, the system according to the invention provides for a lighting system, which changes color and brightness of the office room lighting depending on the outcome of the assessment. For example, in case the elected sub-parameter is worse than expected, worse than last year or the like, the brightness of the office room lighting decreases and the color of the office room lighting turns red. This allows all people which are inside the respective office room to physically experience the quality of the elected sub-parameter.

The invention claimed is:

1. A system for emitting light, comprising
a computer for receiving data, electing one or more parameters associated with the data, and assessing at least one characteristic of the one or more parameters; and
a lighting system connected to the computer and comprising one or more light sources, the lighting system configured to emit light of different characteristics;
wherein the computer determines a characteristic of the light based on an assessed result on the characteristic of the one or more parameters and controls the lighting system to operate in a mood lighting mode where the lighting system emits the light with the determined characteristic based on the assessed result on the characteristic of the one or more parameters,
wherein the computer controls the lighting system to emit colorless light to a location in a standard mode when the mood lighting mode is deactivated,
wherein at least one of the one or more parameters is divided into at least one sub-parameter, the at least one sub-parameter defining an additional condition to the at least one of the one or more parameters, the additional condition being related to at least one of a region, employee, office or timeframe, and
wherein the characteristic of the light is changed depending on an assessed result on a characteristic of the at least one sub-parameter.

2. The system of claim 1, further comprising a display to illustrate at least one of the data and the one or more parameters to a user.

3. The system of claim 1, further comprising a user interface connected to the computer and configured to receive the parameter in response to a user command.

4. The system of claim 1, wherein the characteristic of the light is selected from the group consisting of the brightness of the light, color of the light and color intensity of the light.

5. The system of claim 1, wherein the computer is configured to assess the characteristic of the parameter upon comparison between the elected parameter and a reference value.

6. The system of claim 5, wherein the reference value is the value of the same parameter obtained at a previous point of time or in a previous time period.

7. The system of claim 1, wherein the parameter is selected from the group consisting of turnover values, sales numbers, profits or losses.

8. The system of claim 1, wherein the computer is configured to elect the sub-parameter in response to a user command.

9. The system of claim 1, wherein the computer is configured to assess the characteristic of the sub-parameter upon comparison between the elected sub-parameter and a reference value.

10. The system of claim 9, wherein the reference value is the value of the same sub-parameter obtained at a previous point of time or in a previous time period.

11. Use of a system of claim 1 to illustrate the quality of business data to a user.

12. A method of illustrating the quality of business data to a user, the method comprising the steps of
receiving data at a computer;
electing by the computer one or more parameters associated with said data;
assessing by the computer at least one characteristic of at least one of said elected parameters;
determining a characteristic of light to be emitted by a lighting system, based on an assessed result on the characteristic of the elected parameter;
controlling the lighting system to operate in a mood lighting mode where the lighting system emits the light with the determined characteristic based on assessed result on the characteristic of the elected parameter,
wherein the computer controls the lighting system to emit colorless light to a location in a standard mode when the mood lighting mode is deactivated,
wherein at least one of the one or more parameters is divided into at least one sub-parameter, the at least one sub-parameter defining an additional condition to the at least one of the one or more parameters, the additional condition being related to at least one of a region, employee, office or timeframe, and
wherein the characteristic of the light is changed depending on an assessed result on a characteristic of the at least one sub-parameter.

* * * * *